INVENTOR.
James W. Fodrea
BY
Hugh L. Fisher
ATTORNEY

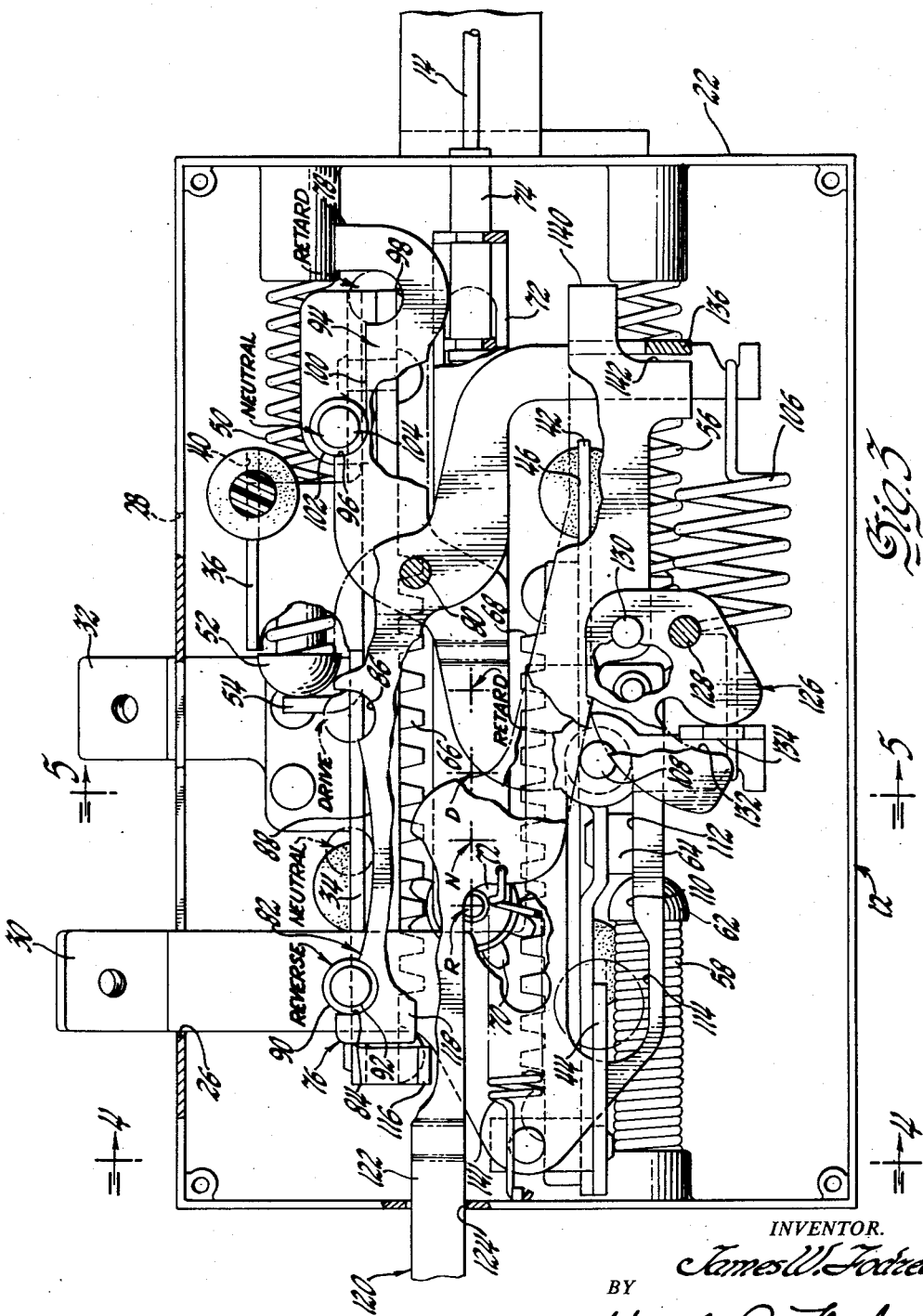

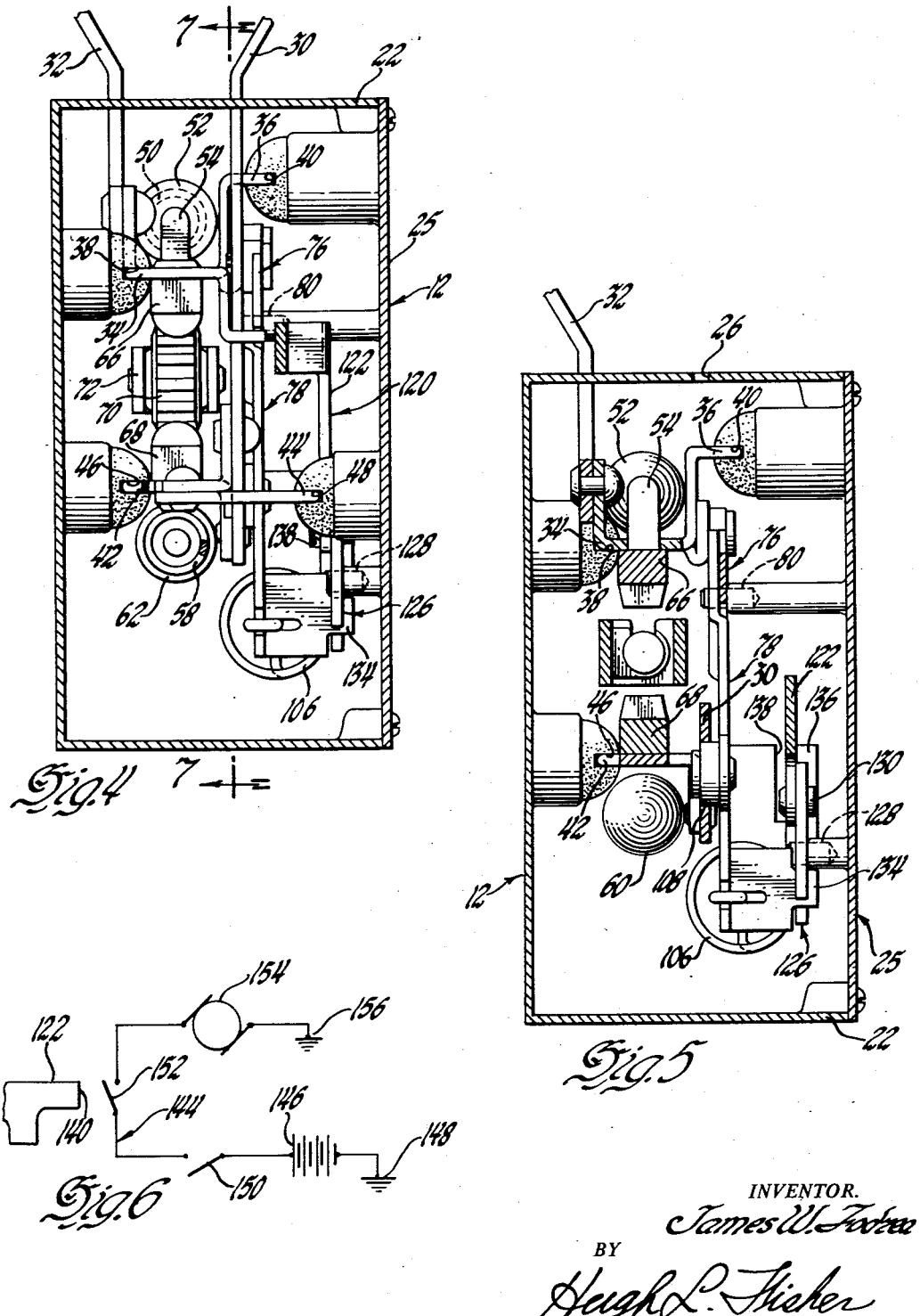

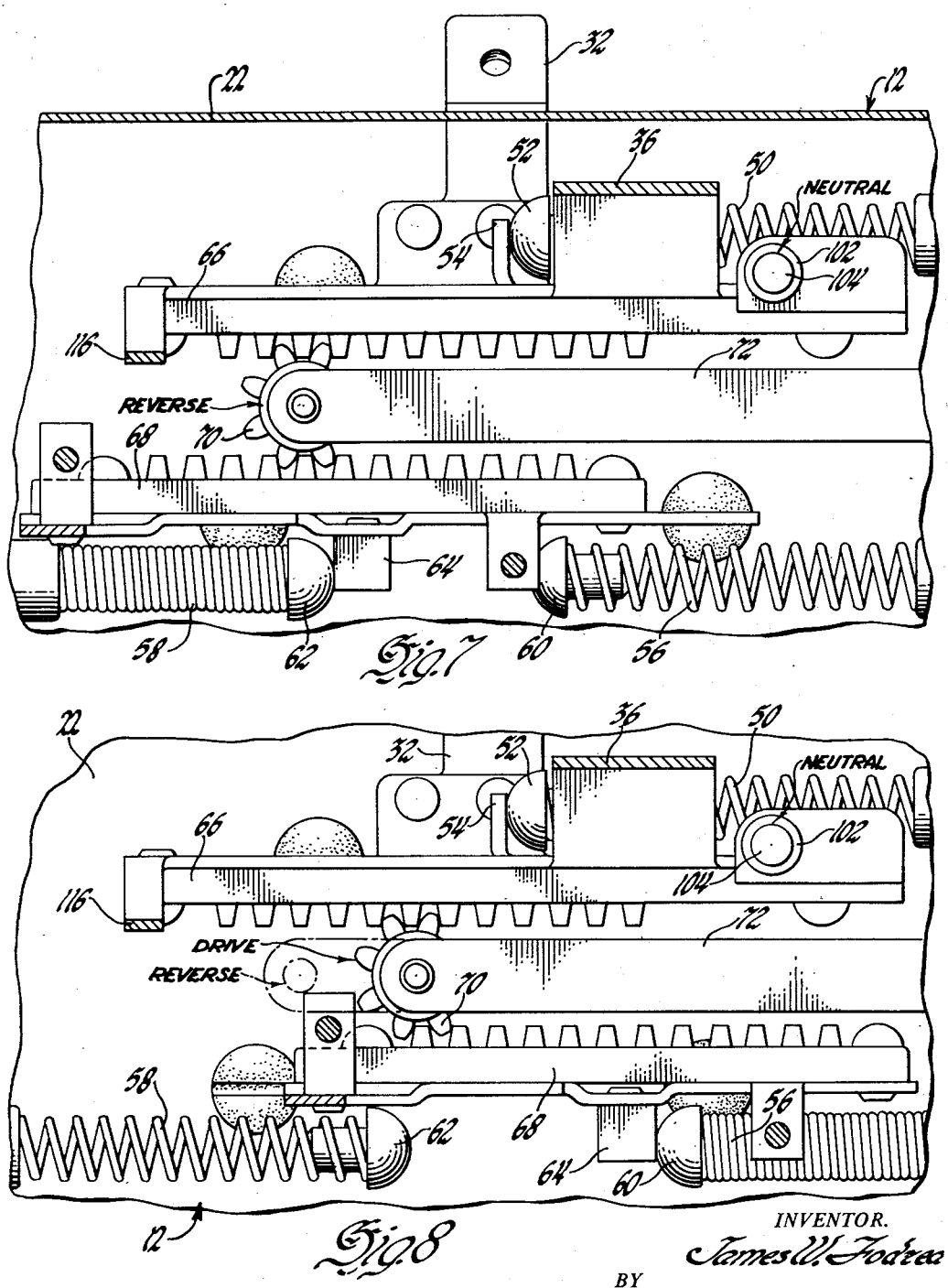

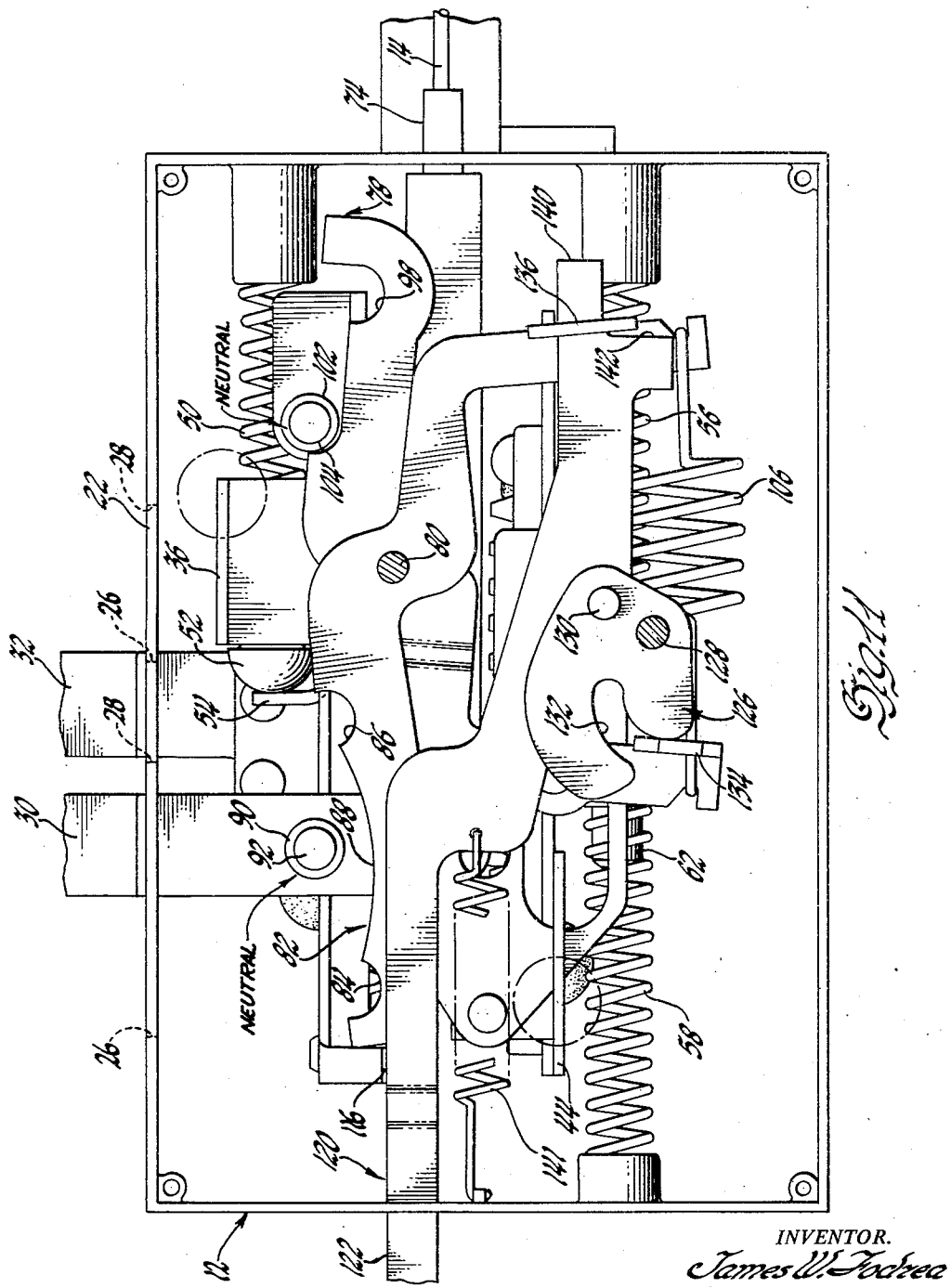

United States Patent Office

3,003,360
Patented Oct. 10, 1961

---

3,003,360
TRANSMISSION SELECTOR CONTROLS
James W. Fodrea, Rochester, Mich., assignor to General Motors Corporation, Detroit, Mich., a corporation of Delaware
Filed Aug. 21, 1958, Ser. No. 756,440
20 Claims. (Cl. 74—335)

This invention relates to selector controls adapted, although not exclusively, for use with vehicle transmissions.

Manually operated vehicle controls, particularly those for automatic transmissions, should not only be conveniently accessible to the driver, but require a minimum of skill on the behalf of the driver to operate. Hence, simple, uncomplicated movements are desired. In fact, the movements should be of such common character that they would, inherently by the nature of the control, be obvious without any special instructions. Further complicating the problem is the necessity for any selector control meeting these requirements to be capable of manufacture according to accepted mass production techniques.

With the foregoing in mind, the invention contemplates a selector control that can easily be mounted within convenient reach of the operator, that requires only simple and uncomplicated operating movements of a common type, and that is of a low cost construction especially suited for mass production procedures.

Moreover, the invention seeks to provide a selector control that utilizes a manually operable control member which is releasably held by a novel detent system in a plurality of settings including a Neutral or Off setting obtainable at any time by a separate cancellation device.

Specifically, the invention affords a selector control which employs a pair of control members, each of which may be positioned in a selected setting only when the other is in a particular setting thereby preventing inadvertent operation, and each of which are returned to a Neutral or Off setting at will by a cancellation device.

A further objective of the invention is to furnish a selector control of the foregoing character arranged to operate a vehicle transmission, and which furnishes a mode of completing the engine cranking circuit after the cancellation device has placed each of the control members in the Neutral or Off setting.

In carrying out the invention according to one embodiment thereof, a manually operable selector control is joined with a vehicle transmission and comprises main and secondary control levers arranged and constructed, through rack and pinion gearing, to change the status of the transmission. The particular transmission setting of each control lever is releasably maintained by uniquely adapted trip arms with provision being made for restraining movement of one of the levers until the other is in a predetermined setting. A cancellation device is combined with the selector control and upon initial operation causes releasing movement of the trip arms so that both of the control levers are returned to a Neutral or Off setting while subsequent operation of the cancellation device completes an engine cranking circuit for starting the engine in a known manner.

The foregoing and other objects and advantages of the invention will be apparent from the following description and from the accompanying drawings, in which:

FIGURE 3 is a sectional view of the selector control taken along line 3—3 of FIGURE 2;

Figure 9:
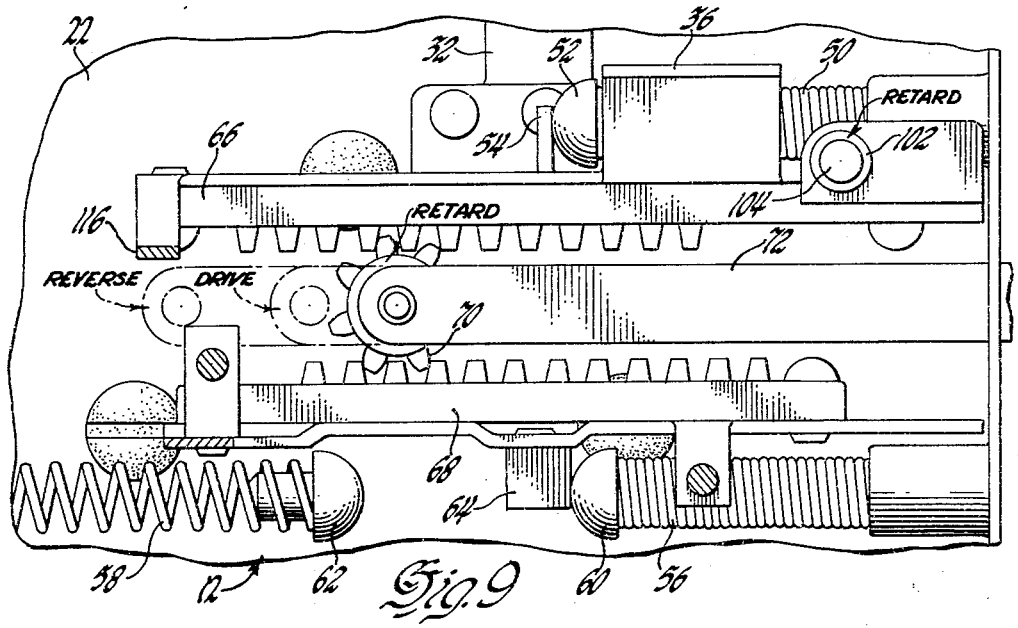
Figure 10:
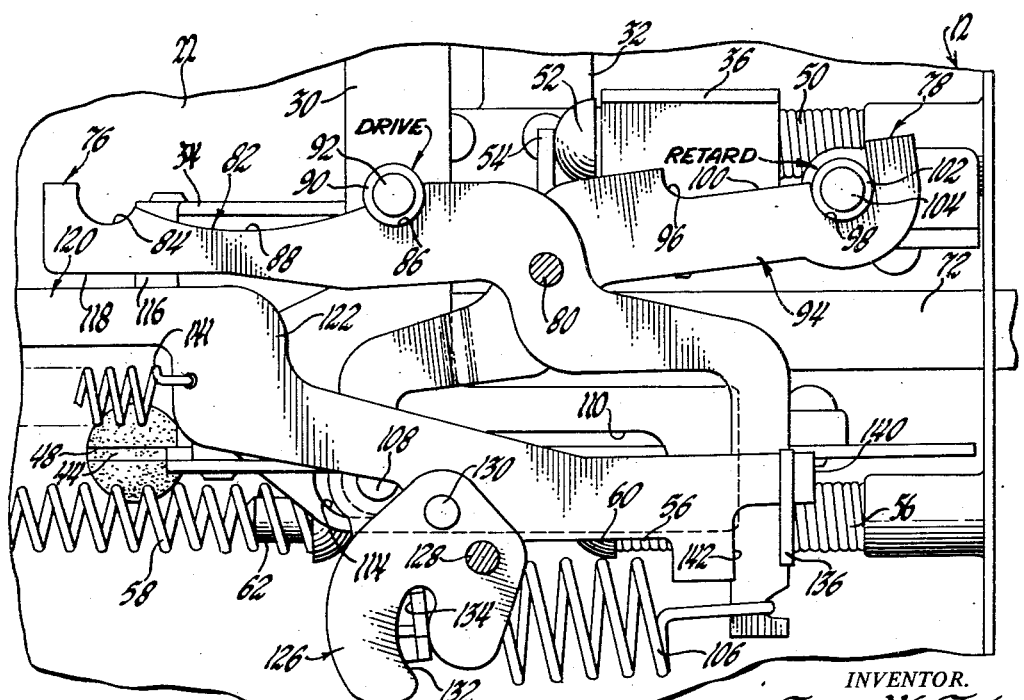

FIGURES 4 and 5 are sectional views of the selector control taken along lines 4—4 and 5—5, respectively, of FIGURE 3;

FIGURE 6 is a view, illustrating schematically, an engine cranking circuit;

FIGURES 7, 8 and 9 are fragmentary sectional views of the selector control demonstrating the relative positions of the racks and pinion, respectively, in the Reverse Drive, Forward Drive and Grade Retard settings;

FIGURE 10 is a fragmentary sectional view of the selector control illustrating the disposition of the trip arms when assuming the Forward Drive and Grade Retard positions; and FIGURE 11 is a view similar to FIGURE 3 of the selector control showing the relative positions of the trip arms when the cancellation device has become effective.

Figure 1:
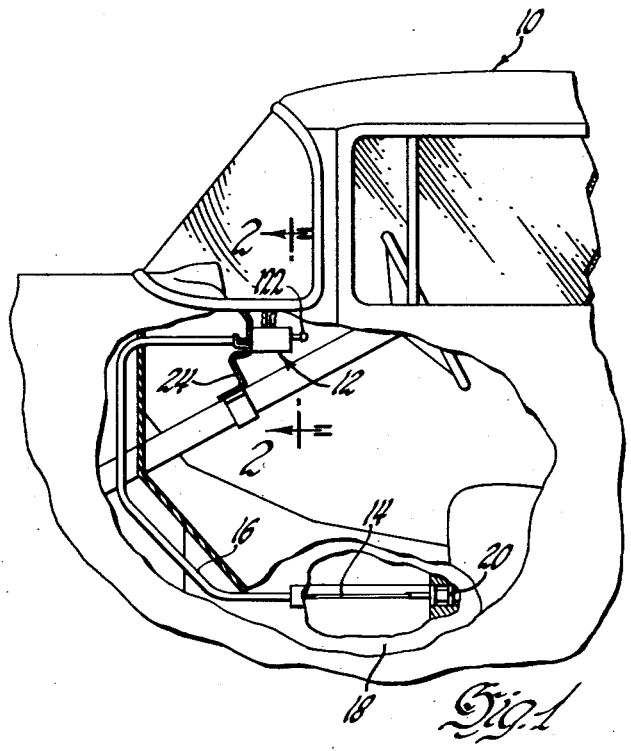
FIGURE 1 is a fragmentary view of a vehicle on which a selector control, constructed according to the invention, is installed for operating the vehicle transmission.

Referring to FIGURE 1, the numeral 10 denotes a motor vehicle on which a transmission selector control 12, incorporating the principles of the invention, is installed. The selector control 12, through a suitable agency, such as a cable 14 shown enclosed by a sheath 16, changes the operating status of the vehicle transmission 18 in any known way, i.e., by manipulating a selector valve 20, or the like, which then directs pressure fluid to the various transmission operating units in the customary manner.

Figure 2:
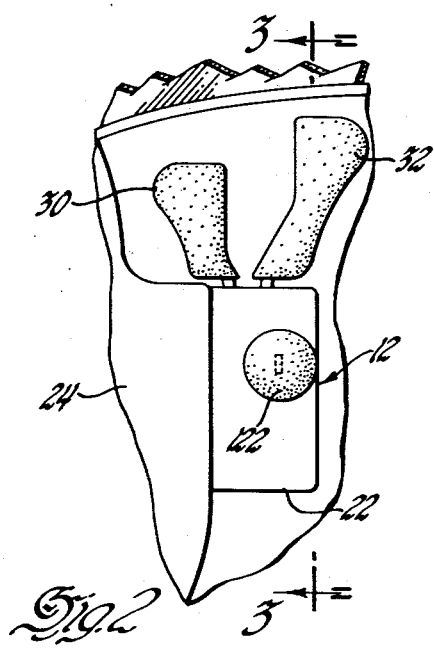
FIGURE 2 is a view of the selector control, as seen from the driver's seat, showing the control mounted on a rearwardly extending left hand section of the instrument panel.

As illustrated in FIGURE 2, the selector control 12 is provided with a housing 22 which is attached to the left side of the vehicle instrument panel 24 so as to be accessible for left hand operation. If desired, the control 12 may be situated for right hand manipulation or for operation by either hand. The housing 22 is enclosed by a cover 25 which is detachably secured thereto. Elongated slots 26 and 28 are formed in the top of the housing 22, through which extend, respectively, a main transmission control member 30 and a secondary transmission control member 32. In the preferred embodiment, depicted by the drawings, the main transmission control member 30 has Forward Drive, Neutral, and Reverse Drive settings representing the corresponding operating condition of the transmission 18 and will hereinafter be referred to as the FNR lever, while the secondary transmission control member 32 has a Neutral or Off setting and a Grade Retard setting, and hereinafter will be referred to as the Grade Retard lever. Although the Grade Retard lever 32 has been so designated, it could be used for establishing another setting, e.g., a Low Range Drive setting for the transmission 18, if wanted.

Preferably, the disposition of the selector control 12 is such that movement of the FNR lever 30 is in a plane substantially parallel to the longitudinal axis of the vehicle 10. Thus, when the driver desires to go forward the FNR lever 30 is moved forward and when the driver wishes to back up the FNR lever 30 is moved backwards. The Grade Retard lever 32 is movable in the same plane as the FNR lever 30 and may be operated only when certain conditions exist, to be explained.

To acquire this fore and aft movement of the levers 30 and 32, the Grade Retard lever 32 is provided, as viewed in FIGURE 4, with oppositely and laterally extending support flanges 34 and 36 which cooperate, respectively with a guide slot 38 in the housing 22 and guide slot 40 in the cover 25. In a similar manner, the FNR lever 30 is provided oppositely and laterally extending support flanges 42 and 44 cooperating, in order, with opposite housing and cover guide slots 46 and 48.

For reasons which will become apparent, both the FNR lever 30 and the Grade Retard lever 32 are urged to the Neutral settings whenever relieved of restrain. With the Grade Retard lever 32, this is accomplished by a return spring 50 which has one end abutting the side of the housing 22 and the other end urging a round headed stud 52 into engagement with an upturned tab 54 on the lever 32. Thus, when the Grade Retard lever 32 is free of any resisting force, it is biased by the spring 50 to the Off setting. To urge the FNR lever 30 to the Neutral setting, opposed front and rear centering springs 56 and 58 are furnished. The front centering spring 56 has one end seated against the housing 22 and the other end provided with a round headed stud 60, while the rear centering spring 58 abuts the housing at one end and has a round headed stud 62 in the other. Between the round headed studs 60 and 62 the FNR lever 30 has a depending ear 64 which the studs 60 and 62 engage. Therefore, when the FNR lever 30 is free to move, the centering springs 56 and 58 will position the FNR lever 30 in the Neutral setting.

The Grade Retard lever 32 has attached or made integral therewith a rack 66 and the FNR lever 30 has a rack 68. The racks 66 and 68 are spaced in confronting relation so that the teeth of each intermesh with a pinion, designated generally at 70. The pinion 70 is journaled on an output carrier 72 which is supported, both through the pinion and rack teeth at one end and at the other end by a guide pin 74 extending through the housing and attached to the upper end of the cable 14. When the Grade Retard lever rack 66 is held, forward movement of the FNR lever rack 68 will revolve the pinion 70 counterclockwise, as viewed in the drawings, which will, in turn, cause the carrier 72 to advance or move forwardly. Conversely, when the FNR lever rack 68 is moved backwards, the pinion 70 will revolve clockwise and cause the carrier 72 to move backwards. If the FNR lever 68 is held stationary, then in a similar manner, forward and reverse movement of the Grade Retard lever rack 66 will, accordingly, move the carrier 72 forwards or backwards. The relative sizes of the racks and pinion will determine the available leverage which will, of course, be dependent on the application and the loads to be overcome by movement of the levers 30 and 32.

The aforementioned settings of the FNR and Grade Retard levers 30 and 32 are releasably maintained, respectively, by trip arms 76 and 78 pivoted to the cover 25 at 80 (see FIGURE 5). The FNR lever trip arm 76 has formed along the upper edge thereof a control surface 82 comprising a Reverse Drive setting notch 84, a Forward Drive setting notch 86 and an arcuate ramp 88 extending therebetween. Coacting with this FNR lever trip arm surface 82 is a cam roller 90 rotatably supported by a pin 92 attached to the FNR lever 30. The Grade Retard lever trip arm 78 also, at the upper end, is provided with a control surface 94 formed with a stop shoulder 96 and a Grade Retard setting notch 98 with an interconnecting ramp 100. A cam roller 102 is revolvably supported on a pin 104 carried by the Grade Retard lever 32 and cooperates with the Grade Retard lever trip arm control surface 96, as will be explained. Extension spring 106 interconnects the lower ends of the FNR lever and Grade Retard lever trip arms 76 and 78, thereby producing a scissors-like action which tends to urge the respective control surfaces 82 and 94 towards each other.

In addition to the limitations from the control surfaces 82 and 94, the movements of the FNR lever 30 and the Grade Retard lever 32 are further restricted since neither may be placed in a different setting under certain conditions, thus avoiding possible damage to the transmission that might otherwise occur. One of these conditions exists when the FNR lever 30 is in any position other than the Forward Drive setting. The Grade Retard lever 32, then, cannot be placed in the Grade Retard setting. This is desirable because whether the lever 32 results in a Low Range Drive or a braking effect such is not generally wanted in Reverse Drive. Another of these conditions is that once the Grade Retard setting is established, the FNR lever 30 may not be removed from the Forward Drive setting until the Grade Retard lever 32 is returned to the Off setting. Again, this insures that the Grade Retard status of the transmission is not retained in Reverse Drive condition.

The prevention of establishment of the Grade Retard setting, unless the FNR lever 30 is in the Forward Drive setting, is afforded, through the coacting of a stop pin 108 attached to the lower end of the Grade Retard lever trip arm 78 and an elongated opening 110 extending fore and aft along the bottom of the FNR lever 30. The opening 110 has a forward narrow section 112 and a rearward enlarged section 114, such that the bottom edge forms a guide track against which the stop pin 108 is biased by the action of the extension spring 106. With the stop pin 108 in the narrow section 112 of the opening 110, the control surface ramp 100 on the Grade Retard lever trip arm 78 is maintained substantially parallel, as shown in FIGURE 3, to the direction of movement of the cam roller 102. Therefore, no holding restraint is possible since cam roller 102 cannot engage notch 98, and upon removal of the manual force of the Grade Retard lever 32, return spring 50 will move it back to the Off setting.

To obtain the Grade Retard setting, the FNR lever 30 is moved to the Forward Drive setting, and then the stop pin 108 will be disposed in the enlarged section 114 of the opening 110. This will allow the cam spring 106 to pivot the Grade Retard lever trip arm control surface 94 upwardly to the FIGURE 10 position. Now, as can be seen, when the Grade Retard lever 32 is moved to the Grade Retard setting, the cam roller 102 will engage the notch 98, and the Grade Retard lever 32 will be releasably retained in this setting until a predetermined force is applied to the lever 32 to return it to the Off setting.

With the Grade Retard lever 32 in the Grade Retard setting and the FNR lever 30 in the Forward Drive setting, both settings being depicted in FIGURE 10, a stop flange 116, extending laterally outwardly in the same direction from the Grade Retard lever 32 as guide flange 36, is located under an edge 118 on the FNR lever trip arm 76. With the stop flange 116 under the edge 118, the FNR lever trip arm 76 cannot move downwardly far enough to permit the cam roller 90 to be shifted by the FNR lever 30 out of engagement with the Forward Drive setting notch 86. Therefore, the Grade Retard lever 32 must be returned to the Off setting so that the stop flange 116 is moved away from edge 118 before the FNR lever 30 can be shifted rearwardly.

The FNR and Grade Retard levers 30 and 32 can be placed in their respective Neutral and Off settings at any time by the operation of a cancellation device, illustrated generally at 120. The device 120 comprises an elongated cancellation lever 122 which extends externally of the housing 22 through a guide slot 124 therein affording support at this point. Additional support is provided by a cam 126 which is pivoted to cover 25 at 128 and to the cancellation lever at 130. The cam 126 has an arcuate opening 132 therein arranged to receive a laterally extending ear 134 on the bottom of the Grade Retard lever trip arm 78. Another ear 136, laterally extending from the bottom of the FNR lever trip arm 76, is provided with an opening 138 (see FIGURE 5) through which extends a terminal end 140 of the cancellation lever 122. When the cancellation lever 122 is moved forwardly slightly, i.e., to the right from the FIGURE 3 Off position, against the bias from a spring 141, the cam 126 will, through the ear 134, revolve the Grade Retard lever trip arm 78 sufficiently to move the trip arm control surface 94 downwardly, assuming the Grade Retard lever 32 is in the Grade Retard setting, so that the cam roller 102 will be freed from the restraint of the Grade Retard setting notch 98. This will cause the return spring 50 to become effective and move the Grade Retard lever 32 to the Off setting. Further movement of the cancellation lever 122 will move an edge 142 on the lever 122 near the terminal end 140 thereof into engagement with the side of the trip arm ear 136 and force the FNR lever trip arm control surface 82 downwardly. Whereupon, whichever notch, the Reverse Drive setting notch 84 or the Forward Drive setting notch 86 is effective at this time, will be disengaged from the FNR lever cam roller 90 and the centering springs 56 and 58 will return the FNR lever 30 to the Neutral setting. As just described, movement of the cancellation lever first releases the Grade Retard lever 32 and then the FNR lever 30. However, this sequence can be reversed, or they can be released simultaneously, if wanted, simply by altering the relationship of the cam 126 with ear 134 and that of the edge 142 with the ear 136 (See FIGURE 11).

The cancellation device 120 has another function and that is to control the starting of the vehicle engine. To explain, reference is made to FIGURE 6 which shows an engine cranking circuit at 144. Circuit 144 has a source of voltage, such as the vehicle battery 146 grounded at 148, and extends through an ignition switch 150 and a neutral safety switch 152 to an engine cranking motor 154 and to ground at 156. When both the ignition switch 150 and the neutral safety switch 152, which is normally biased open, are closed, then the circuit 144 is completed and will operate in a known manner to start the vehicle engine. The neutral safety switch 152 is only closed after the cancellation lever 122 is moved to the extent of its movement which is after both the FNR lever 30 and the Grade Retard lever 32 have been released and returned to their respective Neutral settings, as described. Then, the cancellation lever terminal end 140 will engage and close the neutral safety switch 152.

To summarize the operation of the transmission selector control 12, assume that the vehicle is stationary and that the engine is not running. The first step, then, is to depress the cancellation lever 122 which, as has been explained, will return the FNR and Grade Retard levers 30 and 32 to their Neutral and Off settings, if not already in these settings, and subsequently complete the engine cranking circuit 144, presuming that the ignition switch 150 is closed. This will start the engine, and then, the FNR lever 30 may be moved to the Forward Drive setting if the operator wishes to go forward. When the operator moves the FNR lever 30 to this Forward Drive setting, the FNR lever rack 68 will move forwardly and revolve the pinion 70 counterclockwise. The Grade Retard lever rack 66 will attempt to move rearwardly, i.e., to the left as observed in FIGURE 3, but cannot because the Grade Retard cam roller 102 is in engagement with the control surface shoulder 96 on the Grade Retard lever trip arm 78. Therefore, the pinion 70 will advance and carry therewith carrier 72 to the FIGURE 8 position and the transmission 18 to the corresponding status. In moving to the Forward Drive setting, the FNR lever cam roller 90 will proceed along the control surface ramp 100 on the FNR lever trip arm 76 and because of the arcuate contour will force the control surface 82 downwardly against the opposing bias from the extension spring 106 until the cam roller 90 is aligned with the Forward Drive setting notch 96, at which time the extension spring 106 will effect an engagement therebetween to the depth viewed.

The FNR lever 30 may be returned to the Neutral setting by exerting sufficient force to overcome the detent effect from the extension spring 106, whereupon the cam roller 90 will be removed from Forward Drive setting notch 86. As soon as this removal is made, the centering springs 56 and 58 become effective and return the FNR lever 30 to the Neutral setting. During this movement, the FNR lever rack 68 is moved rearwardly which will cause the pinion 70 to revolve clockwise and attempt to move the Grade Retard lever rack 66 forwardly against the opposition from the return spring 50. This opposition will be enough so that the pinion 70 and carrier 72 will move rearwardly to the Neutral setting. Further backward movement of the FNR lever will establish the Reverse Drive setting with the FNR lever cam roller 90 moving into engagement with the Reverse Drive setting notch 84 in the manner aforedescribed with respect to the Forward Drive setting notch 86. Removal of the FNR lever 30 from the Reverse Drive setting takes place in the same manner as during the removal from the Forward Drive setting except in the opposite direction.

As has been mentioned, the Grade Retard lever 32 can only be placed in the Grade Retard setting when the FNR lever 30 is in the Forward Drive setting. Assuming that the FNR lever 30 is in the Forward Drive setting, then the Grade Retard lever trip arm 78 will assume the FIGURE 10 position due to the explained relationship between the elongated opening 110 in the bottom of the FNR lever 30 and the stop pin 108 carried by the trip arm 78. When the Grade Retard lever 32 is moved forwardly, the Grade Retard lever rack 66 will advance and revolve the pinion 70 clockwise, as viewed in FIGURE 9. This action will attempt to move the FNR lever rack 68 rearwardly which movement will be resisted by the engagement between the FNR lever cam roller 90 and the Forward Drive setting notch 86 in the control surface 72 of the FNR lever trip arm 76. Therefore, the pinion 70 will move the carrier 72 forwardly to the FIGURE 9 position and change the transmission 18 to this status. During this movement, as has been described, the stop flange 116 on the Grade Retard lever 32 moves under the edge 118 of the FNR lever trip arm 76 and, consequently, the FNR lever 30 cannot be moved because of the restraining effect from the FNR lever trip arm notch 86.

To remove the Grade Retard lever 32 from the Grade Retard setting, adequate force must be exerted to remove cam roller 102 from the Grade Retard setting notch 98, whereupon the return spring 50 will take over and move the Grade Retard lever 32 to the Off setting. When the Grade Retard lever rack 66 shifts rearwardly, the pinion 70 is revolved counterclockwise and attempts to move the FNR lever rack 68 forwardly and again this is resisted by the engagement between the FNR lever cam roller 90 and the Forward Drive setting notch 86 in the control surface 82 of the FNR lever trip arm 76. With the Grade Retard lever 32 returned to the Off setting then the FNR lever 30 may be operated in the manner just described.

From the foregoing, it can be seen that conveniently accessible control levers are easily operated and through gearing, which may be altered to afford the necessary leverage ratios, change the transmission status without undue exertion or any special skill upon the part of the driver. Moreover, simply by depressing the cancellation lever 122, the transmission can be placed in Neutral and then the vehicle started without any additional action required upon the part of the driver. Under certain conditions one lever cannot be moved with respect to another, hence, insuring that an unwanted transmission condition is not inadvertently established. Moreover, the selector control affords a detent feel for each transmission setting without such having to be provided elsewhere, e.g., within the transmission at a substantial distance from the driver actuated controls.

The invention is to be limited only by the following claims.

1. In a selector control, the combination of a plurality of control members, each being arranged for individual movement in a plane to a series of settings including a Neutral setting and also being arranged for removal from the Neutral settings of each so that both members may be in another setting other than Neutral at the same time, an output element, means for transferring movement of each of the control members to the output element, and cancellation means including a cancellation member arranged for movement in a plane different from the plane of movement for the control members, the cancellation member being operative to return the control members to the respective Neutral setting of each.

2. In a selector control, the combination of a plurality of control members, each being arranged for movement in a plane to a series of settings including a Neutral setting, an output element, gearing means for transferring movement of each of the plurality of control members to the output element, and cancellation means including a cancellation member arranged for movement in a plane different from the plane of movement for the control members, the cancellation member being operative to return the control members to the respective Neutral setting for each.

3. In a selector control, the combination of a plurality of control members, each being arranged for movement in a plane to a series of settings including a Neutral setting, an output element, rack and pinion means for transferring movement of each of the plurality of control members to the output element, and cancellation means including a cancellation member arranged for movement in a plane different from the plane of movement for the control members, the cancellation member being operative to return the control members to the respective Neutral setting for each.

4. In a selector control, the combination of a plurality of control members, one of the members having an operative setting and an inoperative setting, another of the members having a series of operative settings and an inoperative setting, an output element, means for transferring movement of each of the control members to the output element, and means for preventing said one of the control members from being placed in the operative setting thereof until said another of the control members is positioned in a certain one of the operative settings thereof.

5. In a selector control, the combination of a pair of control members, each being arranged for movement to a series of settings including a Neutral setting, an output element, means for transferring movement of each of the control members to the output element, first means for preventing one of the control members from being placed in a setting other than the Neutral setting thereof until the other of the control members is positioned in a predetermined setting, and second means for preventing movement of the other of the control members from said predetermined setting when said one of the pair of control members is removed from the Neutral setting thereof.

6. In a transmission selector control, the combination of a manually operable control member arranged for movement in a plane to a series of transmission conditioning settings including a Neutral setting, an output element for conditioning the transmission for different operating ranges corresponding to the series of control member settings, motion transmitting means for transferring movement of the control member to the output element, and cancellation means including a cancellation member arranged for movement in a plane different from the plane of movement for the control member, the cancellation member being operative to return the control member to the Neutral setting.

7. In a transmission selector control for an engine driven vehicle provided with an engine cranking circuit, the combination of a plurality of control members, each being arranged for movement in a plane to a series of settings including a Neutral setting, an output element, means for transferring movement of each of the control members to the output element, and cancellation means including a cancellation member arranged for movement in a plane different from the plane of movement for the control members, the cancellation member being operative initially to return each of the control members to their respective Neutral settings and subsequently to complete the engine cranking circuit.

8. In a transmission selector control for an engine driven vehicle provided with an engine cranking circuit, the combination of manually operable main and secondary control members, each being arranged for movement to a series of transmission conditioning settings including a Neutral setting, an output element for conditioning the transmission for different operating ranges corresponding to the series of settings of the main and secondary control members, motion transmitting means for transferring movement of each of the main and secondary control members to the output element, first means for preventing the secondary control member from being placed in a setting other than the Neutral setting thereof until the main control member is positioned in a predetermined setting, second means for preventing movement of the main control member from said predetermined setting when the secondary control member is removed from the Neutral setting thereof, detent means for releasably holding the main and secondary control members in the selected settings of each, and cancellation means operative initially to return each of the main and secondary control members to their respective Neutral settings and subsequently to complete the engine cranking circuit.

9. In a transmission selector control, the combination of manually operable main and secondary control members, each being arranged for movement to a series of settings including a Neutral setting, an output element for conditioning the transmission for different operating ranges corresponding to the settings of the main and secondary control members, rack and pinion means for transferring movement of each of the main and secondary control members to the output element, detent means for releasably holding each of the main and secondary control members in a selected one of the series of settings thereof, the detent means including trip arms pivotally supported and provided with control surfaces, a cam movable with each of the main and secondary control members and engageable with the control surfaces, biasing means urging the control surfaces into engagement with the cams so as to afford a predetermined resistance to releasing movement of the trip arms when the selected settings of the control members are changed, and means preventing each control member from being placed in one setting therefor until the other control member is in a predetermined setting.

10. In a transmission selector control; the combination of main and secondary control members; the main control member being movable to a plurality of transmission settings including a Neutral setting; the secondary control member being movable between On and Off positions; the On position representing another transmission setting; an output element for conditioning the transmission for different operating ranges corresponding to the settings of the control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; and detent means for releasably holding the main and secondary control members in selected settings of each; the detent means comprising main and secondary control member operated trip arms, each being pivotally supported and provided with control surfaces, cams movable with each of the main and secondary control members, and biasing means coacting with the trip arms so as to urge the control surfaces into engagement with the cams and afford a predetermined resistance to releasing movement of the trip arms by the coaction between the control surfaces and the cams when the selected settings of the control members are changed.

11. In a transmission selector control; the combination of main and secondary control members; the main control member being movable to a plurality of transmission settings including a Neutral setting; the secondary control member being movable between On and Off positions; the On position representing another transmission setting; an output element for conditioning the transmission for different operating ranges corresponding to the settings of the control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected settings of each; the detent means comprising main and secondary control member operated trip arms, each being pivotally supported and provided with control surfaces, cams movable with each of the main and secondary control members, and biasing means coacting with the trip arms so as to urge the control surfaces into engagement with the cams and afford a predetermined resistance to releasing movement of the trip arms by the coaction between the control surface and the cams when the selected settings of the control members are changed; centering means for urging the main control member to the Neutral setting; and biasing means for urging the secondary control member to the Off position.

12. In a transmission selector control; the combination of main and secondary control members; the main control member being movable to a plurality of transmission settings including a Neutral setting; the secondary control member being movable between On and Off positions; the On position representing another transmission setting; an output element for conditioning the transmission for different operating ranges corresponding to the settings of the control members; motion transmitting means for transferring movement of the main and secondary control members to the output element; the motion transmitting means including main and secondary control member actuated racks; a pinion intermeshing with each of the racks, and a carrier drive connected to the output element and revolvably supporting the pinion; detent means for releasably holding the main and secondary control member in selected settings of each; the detent means comprising main and secondary control member operated trip arms, each being pivotally supported and provided with control surfaces, cams movable with each of the main and secondary control members, and biasing means coacting with the trip arms so as to urge the control surfaces into engagement with the cams and afford a predetermined resistance to releasing movement of the trip arms by the coaction between the control surfaces and the cams when the selected settings of the control members are changed; a stop on the secondary control member for preventing releasing movement of the main control member trip arm when the secondary control member is in the On position; and a stop on the main control member for coacting with the secondary control member trip arm to prevent the secondary control member trip arm from holding the secondary control member in the On position until the main control member is in a selected setting.

13. In a transmission selector control; the combination of main and secondary control members; the main control member being movable to a plurality of transmission settings including a Neutral setting; the secondary control member being movable between On and Off positions; the On position representing another transmission setting; an output element for conditioning the transmission for different operating ranges corresponding to the settings of the control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected settings of each; the detent means comprising main and secondary control member operated trip arms, each being pivotally supported and provided with control surfaces, cams movable with each of the main and secondary control members, and biasing means coacting with the trip arms so as to urge the control surfaces into engagement with the cams and afford a predetermined resistance to releasing movement of the trip arms by the coaction between the control surfaces and the cams when the selected settings of the control members are changed; centering means for urging the main control member to the Neutral setting; biasing means for urging the secondary control member to the Off position; a stop on the secondary control member for preventing releasing movement of the main control member trip arm when the secondary control member is in the On position; and a stop on the main control member for coacting with the secondary control member trip arm to prevent the secondary control member trip arm from holding the secondary control member in the On position until the main control member is in a predetermined setting.

14. In a transmission selector control; the combination of main and secondary control members; the main control member being movable to a plurality of transmission settings including a Neutral setting; the secondary control member being movable between On and Off positions; the On position representing another transmission setting; an output element for conditioning the transmission for different operating ranges corresponding to the settings of the control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected ones of the settings of each; the detent means comprising main and secondary control member operated trip arms, each being pivotally supported and provided with control surfaces, cams movable with each of the main and secondary control members, and trip arm biasing means coacting with the trip arms so as to urge the control surfaces into engagement with the cams and afford a predetermined resistance to releasing movement of the trip arms by the coaction between the control surfaces and the cams when the selected settings of the control members are changed; centering means for urging the main control member to the Neutral setting; biasing means for urging the secondary control member to the Off position; and cancellation means coacting with both the main and secondary control member trip arms and operative to effect releasing movement of each so that the centering means and biasing means return the main and secondary control members, respectively, to the Neutral setting and the Off position.

15. In a transmission selector control; the combination of main and secondary control members; the main control member being movable to a plurality of transmission settings including a Neutral setting; the secondary control member being movable between On and Off positions; the On position representing another transmission setting; an output element for conditioning the transmission for different operating ranges corresponding to the settings of the control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected settings of each; the detent means comprising main and secondary control member operated trip arms, each being pivotally supported and provided with control surfaces, cams movable with each of the main and secondary control members, and trip arm biasing means coacting with the trip arms so as to urge the control surfaces into engagement with the cams and afford a predetermined resistance to releasing movement of the trip arms by the coactions between the control surfaces and the cams when the selected settings of the control members are changed; centering means for urging the main control member to the Neutral setting; biasing means for urging the secondary control member to the Off position; a stop on the secondary control member for preventing releasing movement of the main control member trip arm when the secondary control member is in the On position; a stop on the main control member for coacting with the secondary control member trip arm to prevent the secondary control member trip arm from holding the secondary control member in the On position until the main control member is in a predetermined setting; and a cancellation member coacting with the main and secondary control member trip arms and operative to effect releasing movement of the main and secondary control member trip arms so that the centering and biasing means return the main and secondary control members, respectively, to the Neutral setting and the Off position.

16. In a transmission selector control; the combination of main and secondary control members; the main control member being movable to a plurality of transmission settings including a Neutral setting; the secondary control member being movable between On and Off positions; the On position representing another setting; an output element arranged to condition the transmission for different operating ranges corresponding to the settings and positions of the main and secondary control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected settings of each; the detent means comprising main and secondary control member operated trip arms, each having a common pivotal support and arranged to have scissors-like action with respect to each other, the trip arms both having control surfaces thereon with sections of each corresponding to the settings of the respective control members, cams movable with each of the main and secondary control members, and a trip arm spring for urging the control surfaces towards each other so as to cause the cams and the setting sections of the control surfaces thereon to be in engagement and afford a predetermined resistance to releasing movement of the trip arms when the setting of the control members are changed; centering springs for urging the main control member to the Neutral setting; a biasing spring for urging the secondary control member to the Off position; a stop on the secondary control member for preventing releasing movement of the main control member trip arm when the secondary control member is in the On setting; a stop on the main control member for coacting with the secondary control member trip arm to prevent the secondary control member trip arm from holding the secondary control member in the On setting until the main control member is in a predetermined setting, and a cancellation member coacting with both the main and secondary control member trip arms and arranged to effect releasing movement of each trip arm so that the centering springs and the biasing spring return the main control member and the secondary control member, respectively, to the Neutral setting and Off position.

17. In a transmission selector control for an engine driven vehicle provided with an engine cranking circuit; the combination of main and secondary control members; the main control member being movable to a plurality of transmission settings including a Neutral setting; the secondary control member being movable between On and Off positions; the On position representing another setting; an output element arranged to condition the transmission for different operating ranges corresponding to the settings and positions of the main and secondary control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected settings of each; the detent means comprising main and secondary control member operated trip arms, each being pivotally supported and provided with control surfaces, cams movable with each of the main and secondary control members, and trip arm biasing means for urging the control surfaces into engagement with the cams and afford a predetermined resistance to releasing movement of the trip arms when the selected settings of the control members are changed; centering means for urging the main control member to the Neutral setting; biasing means for urging the secondary control member to the Off position; and a cancellation member coacting with both the main and secondary control member trip arms and arranged to effect initially releasing movement of each trip arm so that the centering means and the biasing means return the main control member and the secondary control member, respectively, to the Neutral setting and Off position and subsequently complete the engine cranking circuit.

18. In a transmission selector control for an engine driven vehicle provided with an engine cranking circuit; the combination of main and secondary control members; the main control member being movable to a plurality of transmission settings including a Neutral setting; the secondary control member being movable between On and Off positions; the On position representing another setting; an output element arranged to condition the transmission for different operating ranges corresponding to the settings and positions of the main and secondary control members; motion transmitting means for transferring movement of the main and secondary control members to the output element; the motion transmitting means including main and secondary control member actuated racks, a pinion intermeshing with each of the racks, and a carrier drive connected to the output element and revolvably supporting the pinion; detent means for releasably holding the main and secondary control members in selected settings of each; the detent means comprising main and secondary control member operated trip arms, each having a common pivotal support and arranged to have scissors-like action with respect to each other, the trip arms both having control surfaces thereon with sections of each corresponding to the settings of the respective control members, cams movable with each of the main and secondary control members, and a trip arm spring urging the control surfaces towards each other so as to cause the cams and the setting sections of the control surfaces thereon to be in engagement and afford a predetermined resistance to releasing movement of the trip arms when the setting of the control members are changed; centering springs for urging the main control member to the Neutral setting, a biasing spring for urging the secondary control member to the Off position; a stop on the secondary control member for preventing releasing movement of the main control member trip arm when the secondary control member is in the On setting; a stop on the main control member for coacting with the secondary control member trip arm to prevent the secondary control member trip arm from holding the secondary control member in the On setting until the main control member is in a predetermined setting; and a cancellation member coacting with both the main and secondary control member trip arms and arranged to effect initially releasing movement of each trip arm so that the centering springs and the biasing spring return the main control member and the secondary control member, respectively, to the Neutral setting and Off position and subsequently complete the engine cranking circuit.

19. In a selector control, the combination of a plurality of control members, one of the members having operative and inoperative settings, another of the members having a series of operative settings and a Neutral, an output element, means for transferring movement of each of the control members to the output element, first means for preventing said one of the control members from being placed in the operative setting thereof until said another of the control members is poistioned in one of the operative settings thereof, and second means for preventing movement of said another of the control members from said one operative setting when said one of the control members is in the operative setting thereof.

20. In a transmission selector control, the combination of main and secondary control members, the main control member being movable to Forward and Reverse transmission settings from a Neutral setting, the secondary control member being movable between another transmission setting and a Neutral setting, an output element for conditioning the transmission for different operating ranges corresponding to the settings of the control members, and motion transmitting means for transferring movements of the main and secondary control members to the output element.

References Cited in the file of this patent

UNITED STATES PATENTS

| 2,824,459 | Thibodeau | Feb. 25, 1958 |
| 2,848,902 | Hale | Aug. 26, 1958 |
| 2,887,898 | Javanovich et al. | May 26, 1959 |
| 2,939,447 | Lucas et al. | June 7, 1960 |